(12) United States Patent
Christopherson et al.

(10) Patent No.: US 10,631,367 B2
(45) Date of Patent: Apr. 21, 2020

(54) VIRTUALIZED EQUIPMENT FOR MULTI-NETWORK AND CROSS CELL UTILIZATION

(71) Applicant: Verizon Patent and Licensing Inc., Arlington, VA (US)

(72) Inventors: Corey J. Christopherson, Bainbridge Island, WA (US); Donna L. Polehn, Bellevue, WA (US); Fred Weisbrod, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/702,123

(22) Filed: Sep. 12, 2017

(65) Prior Publication Data

US 2018/0302951 A1 Oct. 18, 2018

Related U.S. Application Data

(63) Continuation-in-part of application No. 15/488,134, filed on Apr. 14, 2017.

(51) Int. Cl.
| | |
|---|---|
| *H04W 88/10* | (2009.01) |
| *H04W 48/08* | (2009.01) |
| *H04W 16/14* | (2009.01) |
| *H04B 7/02* | (2018.01) |
| *H04W 8/18* | (2009.01) |
| *H04W 48/18* | (2009.01) |
| *H04W 28/06* | (2009.01) |
| *H04W 72/04* | (2009.01) |
| *H04W 24/08* | (2009.01) |
| *H04W 76/11* | (2018.01) |
| *H04W 76/16* | (2018.01) |

(52) U.S. Cl.
CPC .............. *H04W 88/10* (2013.01); *H04B 7/02* (2013.01); *H04W 8/18* (2013.01); *H04W 16/14* (2013.01); *H04W 48/08* (2013.01); *H04W 48/18* (2013.01); *H04W 76/11* (2018.02); *H04W 76/16* (2018.02); *H04W 24/08* (2013.01); *H04W 28/06* (2013.01); *H04W 72/04* (2013.01)

(58) Field of Classification Search
None
See application file for complete search history.

(56) References Cited

U.S. PATENT DOCUMENTS

| | | | | |
|---|---|---|---|---|
| 2006/0050711 A1* | 3/2006 | Lialiamou | ............... | H04L 12/14 370/395.2 |
| 2007/0091810 A1* | 4/2007 | Kim | ...................... | H04L 1/1635 370/236 |

(Continued)

*Primary Examiner* — Ayaz R Sheikh
*Assistant Examiner* — Tarell A Hampton

(57) ABSTRACT

A user equipment (UE) device may include a memory, a communication interface, an antenna, and one or more processors. The one or more processors operate to identify a plurality of networks available for connection via the communication interface and the antenna assembly. Virtual user equipment (VUE) for two or more of the identified plurality of networks are allocated and the UE device connects to the two or more networks using the respective VUEs. Network characteristics are identified for the connections with the plurality of networks. Data flows for the device are identified. The identified data flows are assigned to the VUEs based on the identified network characteristics.

20 Claims, 10 Drawing Sheets

(56) References Cited

U.S. PATENT DOCUMENTS

| | | | |
|---|---|---|---|
| 2007/0140261 A1* | 6/2007 | Wang | H04L 1/0003 370/395.42 |
| 2009/0116434 A1* | 5/2009 | Lohr | H04L 5/0007 370/329 |
| 2011/0077038 A1 | 3/2011 | Montojo et al. | |
| 2012/0002620 A1* | 1/2012 | Kokku | H04L 47/2441 370/329 |
| 2013/0235807 A1 | 9/2013 | Lee et al. | |
| 2014/0003375 A1 | 1/2014 | Nam et al. | |
| 2014/0036762 A1* | 2/2014 | Al-Shalash | H04W 76/15 370/315 |
| 2014/0086154 A1* | 3/2014 | Sajadieh | H04W 8/18 370/329 |
| 2014/0113682 A1* | 4/2014 | Polehn | H04M 1/72522 455/556.1 |
| 2014/0133395 A1 | 5/2014 | Nam et al. | |
| 2014/0269632 A1 | 9/2014 | Blankenship et al. | |
| 2014/0301345 A1 | 10/2014 | Kim et al. | |
| 2014/0307663 A1 | 10/2014 | Huang et al. | |
| 2015/0289280 A1 | 10/2015 | Davydov et al. | |
| 2015/0327116 A1 | 11/2015 | Zhang et al. | |
| 2015/0381244 A1 | 12/2015 | Byun et al. | |
| 2016/0050053 A1 | 2/2016 | Wong et al. | |
| 2016/0112335 A1* | 4/2016 | Bouanen | H04L 47/2441 370/236 |
| 2016/0150548 A1 | 5/2016 | Wu et al. | |
| 2017/0012750 A1 | 1/2017 | Chen et al. | |
| 2017/0041869 A1* | 2/2017 | Homchaudhuri | H04W 52/0206 |
| 2017/0079003 A1 | 3/2017 | Ji et al. | |
| 2017/0230135 A1 | 8/2017 | Oh et al. | |
| 2018/0020496 A1 | 1/2018 | Vanderveen et al. | |
| 2018/0048465 A1* | 2/2018 | Schliwa-Bertling | G11B 20/0021 |
| 2018/0124854 A1* | 5/2018 | Myhre | H04W 4/70 |
| 2018/0192464 A1 | 7/2018 | Park et al. | |
| 2018/0242304 A1 | 8/2018 | Rong et al. | |
| 2018/0248663 A1 | 8/2018 | Mueller | |
| 2018/0255603 A1 | 9/2018 | Kim et al. | |
| 2018/0263025 A1* | 9/2018 | Kim | H04B 7/26 |
| 2018/0309864 A1 | 10/2018 | Schenk et al. | |
| 2018/0323898 A1* | 11/2018 | Dods | H04L 1/002 |

* cited by examiner

VIRTUALIZED EQUIPMENT FOR MULTI-NETWORK AND CROSS CELL UTILIZATION

CROSS-REFERENCE TO RELATED APPLICATION

The application is a continuation-in-part of U.S. patent application Ser. No. 15/488,134, filed on Apr. 14, 2017, the disclosure of which is hereby incorporated herein by reference in its entirety.

BACKGROUND INFORMATION

To satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices. For example, a base station may service a large number of wireless devices. A large number of wireless devices may overwhelm the resources of the base station or the wireless access network.

More specifically, user devices may connect to a radio access network (RAN) via a radio access network connection with a base station (e.g., a long term evolution (LTE) connection, a 5G connection, etc.). The base station may allocate a quantity of network resources for transferring network traffic to/from the user device and for exchanging overhead control messages with the user device. When a number of user devices above a certain threshold connect to the base station, the user devices may experience degraded network performance as a result of an insufficient quantity of network resources being available for each user device. Moreover, some of the user devices may experience poor signal quality when at a particular location, such as being inside a building, while other nearby user devices experience strong signal quality

DETAILED DESCRIPTION OF PREFERRED EMBODIMENTS

The following detailed description refers to the accompanying drawings. The same reference numbers in different drawings identify the same or similar elements.

Consistent with implementations described, a device may communicate with multiple base stations simultaneously to provide improved throughput to either processes or applications executing on the device, or to devices operatively connected to the device. For example, systems and methods described herein may be implemented within a user device, such as a smart phone or tablet, and allow the device to transmit and receive data to/from multiple base stations, based on various criteria, such as the type or data session, the relative bandwidth or other network characteristics for the available base stations. In other embodiments, the above-described system may be implemented within a wireless access point device that provides connectivity to a number of connected user devices, e.g., via WiFi, wired Ethernet, etc.

Figure 1A:
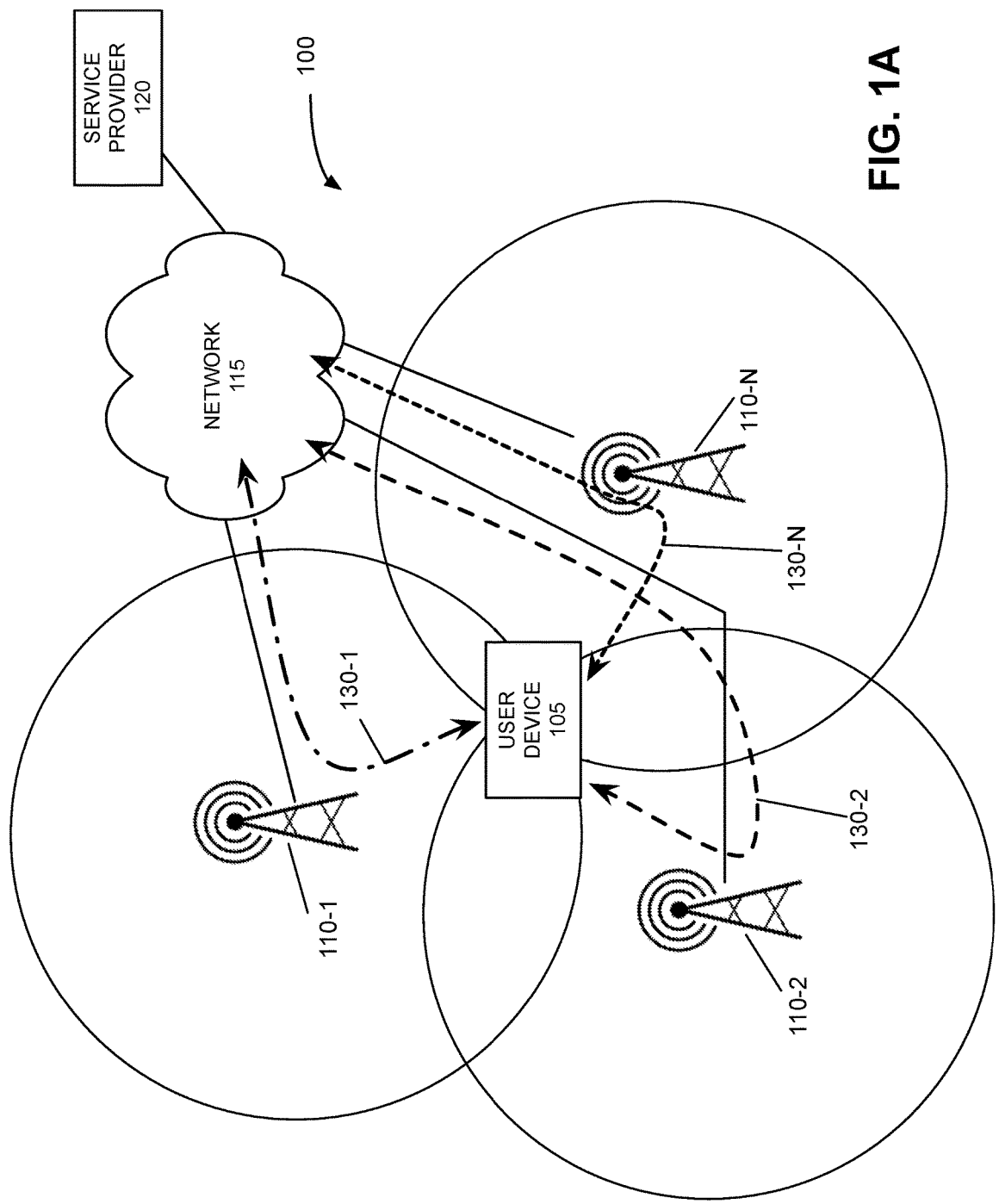
FIG. 1A is a diagram illustrating a first environment according to an implementation described herein.

FIG. 1A is a diagram of an overview of a first exemplary environment 100 in which systems and methods described herein may be implemented. Environment 100 may include a user device 105, a number of base stations 110-1 to 110-N, a network 115, and a service provider 120.

User device 105 may include a mobile device, such as wireless or cellular telephone device (e.g., a conventional cell phone with data processing capabilities), a smart phone, a personal digital assistant (PDA) with cellular access, etc. In another implementation, user device 105 may include any type of mobile computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, an automobile device, etc., that may include communication functionality. User device 105 may connect to network 115 and other devices in environment 100 (e.g., service provider 120, etc.) via a wireless interface described herein. User device 105 and the person associated with user device 105 (e.g., the party holding or using user device 105) may be referred to collectively as user device 105 in the description below.

Base stations 110-1 to 110-N (individually referred to as base station 110 and collectively as base stations 110) may include network devices that provide a radio interface between network 115 and user device 105, with each base station 110 covering a defined region, sometimes referred to as a cell or sector. The coverage areas associated with each base station 110 are graphically depicted in FIG. 1A as circles centered on each base station 110. Although the coverage regions in FIG. 1A are depicted as extending symmetrically or radially about the respective base station, it should be understood that a region of coverage provided by each base station may not by symmetrical or radial in practice, and is based on various characteristics, such as geography, topology, a number and location of any permanent or transient structures (buildings, vehicles, etc.), transmitter power, etc. To provide effective cell coverage, it may be necessary or advantageous for each base station 110 to, where possible, support or cover portions of respective regions that overlap with portions of neighboring regions. Such a layout enables efficient handover from one serving base station to a neighboring base station as necessary, such as when a user device 105 moves from one area to another.

Network 115 may include one or more wired, wireless and/or optical networks that are capable of receiving and transmitting data, voice and/or video signals. For example, network 115 may include one or more public switched telephone networks (PSTNs) or other type of switched network. Network 115 may also include one or more wireless networks and may include a number of transmission towers for receiving wireless signals and forwarding the wireless signals toward the intended destinations. Network 115 may further include one or more satellite networks, one or more packet switched networks, such as an Internet protocol (IP) based network, a local area network (LAN), a wide area network (WAN), a personal area network (PAN), a long term evolution (LTE) network, a WiFi network, a Bluetooth network, an intranet, the Internet, or another type of network that is capable of transmitting data. Network 115 provides wireless packet-switched services and wireless Internet protocol (IP) connectivity to user devices 105 to provide, for example, data, voice, and/or multimedia services.

Service provider 120 may include one or more computer devices and systems associated with providing services via network 115. For example, service provider 120 may store information regarding service plans for a large number of subscribers (also referred to herein as customers) and track data usage for each subscriber over a period of time (e.g., one month).

As shown in FIG. 1A, user device 105 is positioned at a nexus or point of overlap within the coverage regions for each of base stations 110. Given the relative locations of base stations 110 to user device 105 or other factors (interference, obstructions, etc.), no particular base station 110 may exhibit dominant performance relative to the other base stations 110. Such a scenario is referred to as PCI (physical cell identifier) pollution, where a PCI is a semi-unique identifier corresponding to a particular base station that is derived from downlink synchronization signals (e.g., the primary synchronization signal (PSS) and secondary synchronization signal (SSS)) transmitted by the base station. PCI pollution, particularly in combination with other less than optimal network characteristics, such as signal to interference plus noise ratio, etc., may negatively impact throughput or performance by user device 105, particularly with multiple concurrent data sessions (e.g., application download, media streaming, etc.).

Consistent with embodiments described herein, user device 105 may include components configured to enable user device 105 to operatively couple to more than one of base stations 110 simultaneously, in a manner that is transparent to the base stations 110 or functional aspects of network 115.

Arrows 130-1 to 130-N in FIG. 1A illustrate the different connections. In some embodiments, the connections between user device 105 and respective base stations 110 may be based on particular data sessions, base station capacity, signal strength or quality, network statistics, etc. More specifically, as described in additional detail below, user device 105 may be configured to include a plurality or "pool" of virtual user equipment or VUEs. During operation, user device 105 may allocate or assign a particular VUE from the pool of available VUEs with an available base station 110 (e.g., based on respective PCIs). Using the assigned VUEs, user device 105 may negotiate attachment to the each of the available base stations 110 as if different physical devices were each requesting access. Once connected, a scheduling engine may then be configured to map data or traffic associated with particular applications or particular types of data with respective VUEs, so that the respective data sessions are performed using the base station attached to the particular VUE. By enabling user device 105 to connect to and utilize multiple base stations 110 simultaneously, network performance may be essentially aggregated to provide an improved experience, from both a user and a network perspective.

Figure 1B:
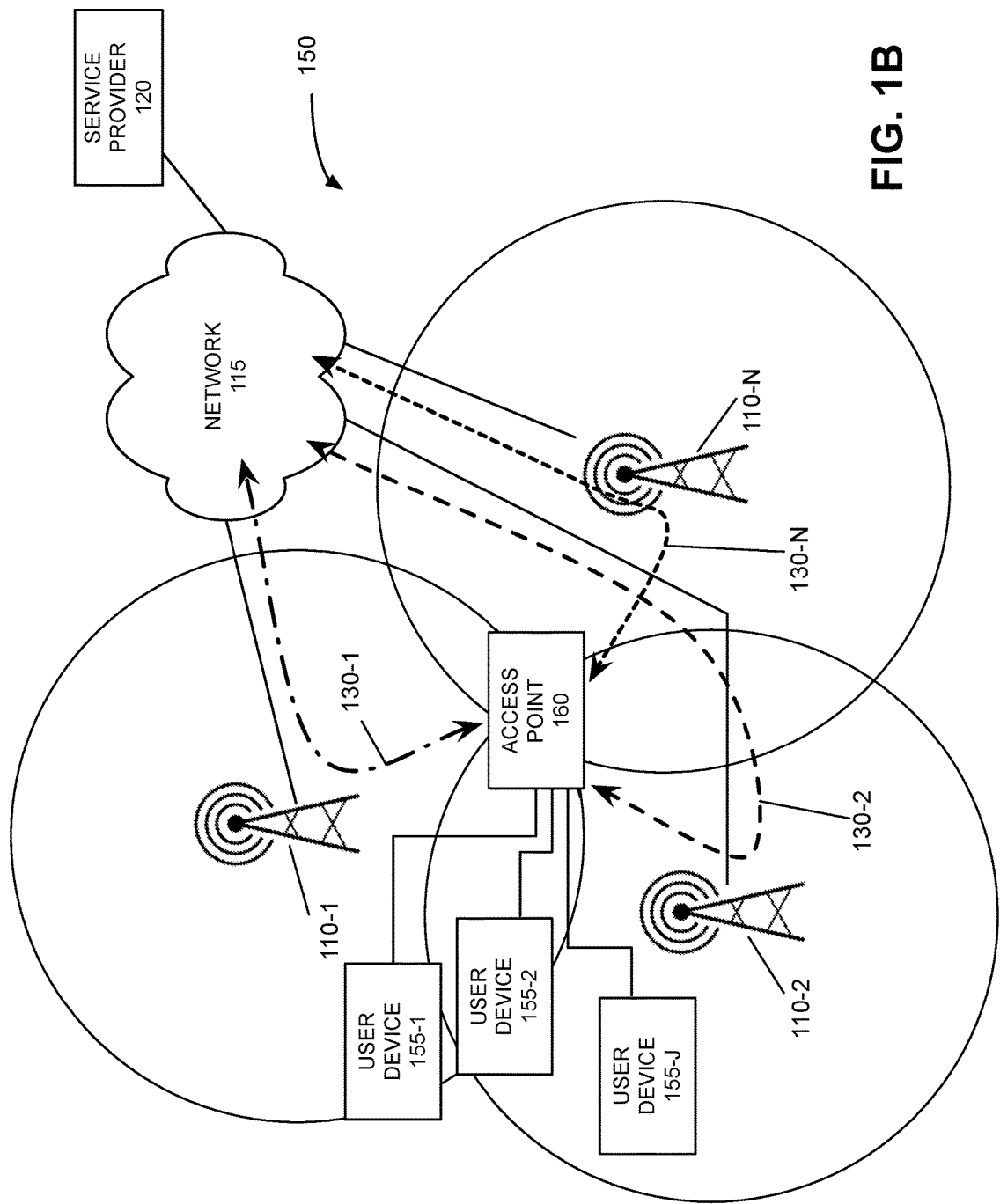
FIG. 1B is a diagram illustrating a second environment according to an implementation described herein.

FIG. 1B is a diagram of an overview of a second exemplary environment 150 in which systems and methods described herein may be implemented. Environment 150 may include user devices 155-1 through 155-J (individually referred to as user device 155 and collectively as user devices 155), access point device 160, base stations 110, wireless network 115, and service provider 120. Where appropriate, like numerals have been used to designate similar elements in each of environments 100 and 150.

For example, similar to environment 100 described above, base stations 110 and network 115 may be configured to receive connection requests from user equipment and to provide network access to connected user equipment. However, unlike the configuration of environment 100, environment 150 includes access point device 160 that includes components configured to provide and allocate the virtual UEs for connection to base stations 110.

Access point device 160 may also include wired or wireless interfaces for operatively connecting to user devices 155, such as WiFi, Ethernet, other types of networks. In environment 150, wireless network 115 may be utilized as a backhaul network and the interface between user devices 155 and access point device 160 may be utilized as the access network.

Although base stations 110 are described herein as corresponding to individual cells or sectors in a one to one relationship, such an implementation is merely exemplary. In other implementations, base stations 110 may support multiple sectors at a single site, for example using antenna arrays oriented in different directions, etc. Consequently, it may be possible for the cross cell aggregation system described herein to be utilized on a single base station 110, rather than across different base stations 110.

Figure 2:
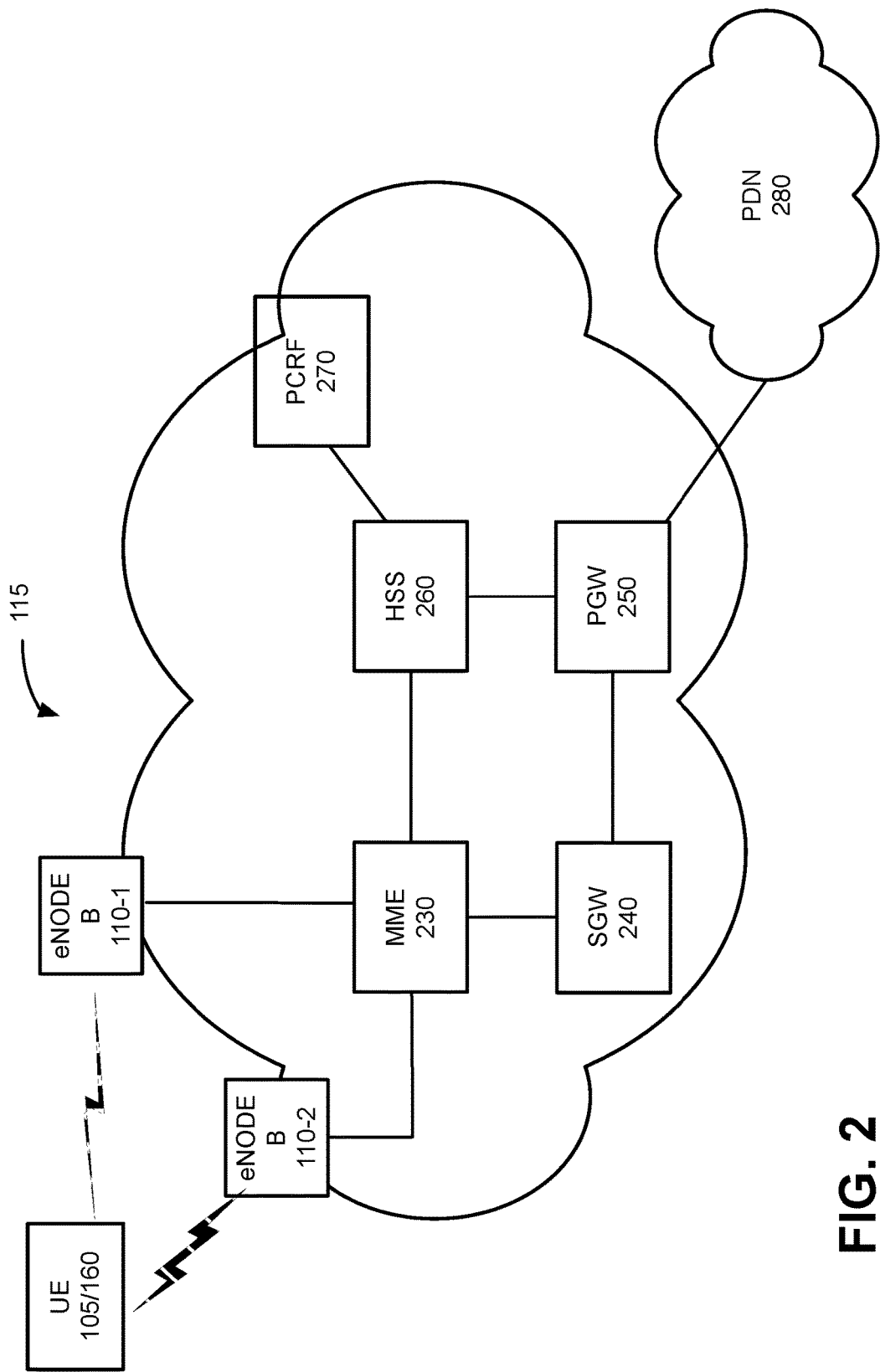
FIG. 2 is a diagram illustrating a portion of an exemplary network of FIGS. 1A and 1B.

FIG. 2 is an exemplary block diagram illustrating a portion of network 115. In the implementation depicted in FIG. 2, network 115 is a long term evolution (LTE) network. It should be understood, however, that embodiments described herein may operate in other types of wireless networks, such as networks operating with other networking standards, such Global System for Mobile Communications (GSM), Universal Mobile Telecommunications System (UMTS), IS-2000, etc.

Network 115 may include an evolved packet core (ePC) that includes base stations 110 (e.g., evolved Node B (eNodeBs) 110), mobile management entity (MME) 230, serving gateway (SGW) 240, packet gateway (PGW) 250, home subscriber server (HSS) 260 and policy and charging rules function (PCRF) 270. Base stations 110 may be part of an evolved Universal Mobile Telecommunications System (UMTS) Terrestrial Radio Access Network (eUTRAN).

Base stations 110 may include one or more devices and other components having functionality that allow user device 105/access point device 160 to wirelessly connect to network 115. As briefly described above, base stations 110 may be associated with one or more cells/sectors. For example, each cell or sector in network 115 may include one or more radio frequency (RF) transceivers pointed in a particular direction. In one implementation, some of the base stations 110 may be associated with multiple sectors (e.g., 2, 3 or more) of network 115. In such an implementation, a base station 110 may include multiple RF transceivers pointed in different directions to service different geographic areas. The term "sector" as used herein shall be broadly construed as any geographic area associated with a base station 110 (e.g., eNode B) or other element of a radio network, and may be used interchangeably with the term "cell." Each sector in network 115 may also be associated with multiple carriers. For example, a base station 110 may include multiple radios that operate at different frequencies or different frequency bands in the same sector.

Base stations 110 may interface with MME 230. MME 230 may include one or more devices that implement control plane processing for network 115. For example, MME 230 may implement tracking and paging procedures for user devices 105/access point device 160, may activate and deactivate bearers for user devices 105, may authenticate respective users of user devices 105, and may interface with non-LTE radio access networks. A bearer may represent a logical channel with particular quality of service (QoS) requirements, and can be used in some embodiments to control packet flows as described herein. MME 230 may also select a particular SGW 240 for a particular user device 105/access point device 160. MME 230 may interface with other MME devices (not shown) in network 115 and may send and receive information associated with user device 105/access point device 160, which may allow one MME 230 to take over control plane processing of user device 105/access point device 160 serviced by another MME 230, if the other MME 230 becomes unavailable.

SGW 240 may provide an access point to and from user devices user device 105/access point device 160, may handle forwarding of data packets for user device 105/access point device 160, and may act as a local anchor point during handover procedures between base stations 110. SGW 240 may interface with PGW 250. PGW 250 may function as a gateway to a packet data network (PDN) 280, such as a wide area network (WAN) (e.g., the Internet, etc.) that allows delivery of Internet protocol (IP) services to user devices 105/155.

HSS 260 may store information associated with user device 105/access point device 160 and/or information associated with users of user device 105/access point device 160. For example, HSS 260 may store user profiles that include authentication and access authorization information. Each user/subscription profile may include a list of user device 105/access point device 160 associated with the subscriptions as well as an indication of which user device 105/access point device 160 are active (e.g., authorized to connect to network 115).

PCRF 270 may implement policy charging and rule functions, such as providing quality of service (QoS) requirements, bandwidth and/or charges for a particular service for user device 105/access point device 160. PCRF 270 may determine how a certain service data flow will be treated, and may ensure that user plane traffic mapping and treatment is in accordance with a user's subscription profile.

Although FIG. 2 shows exemplary components of network 115, in other implementations, network 115 may include fewer components, different components, differently arranged components, or additional components than depicted in FIG. 2. For example, network 115 may include a large number of base stations 110, MMEs 230, SGWs 240, PGWs 250, HSSs 260 and PCRFs 270. Additionally, or alternatively, one or more components of network 115 may perform functions described as being performed by one or more other components.

Figure 3:
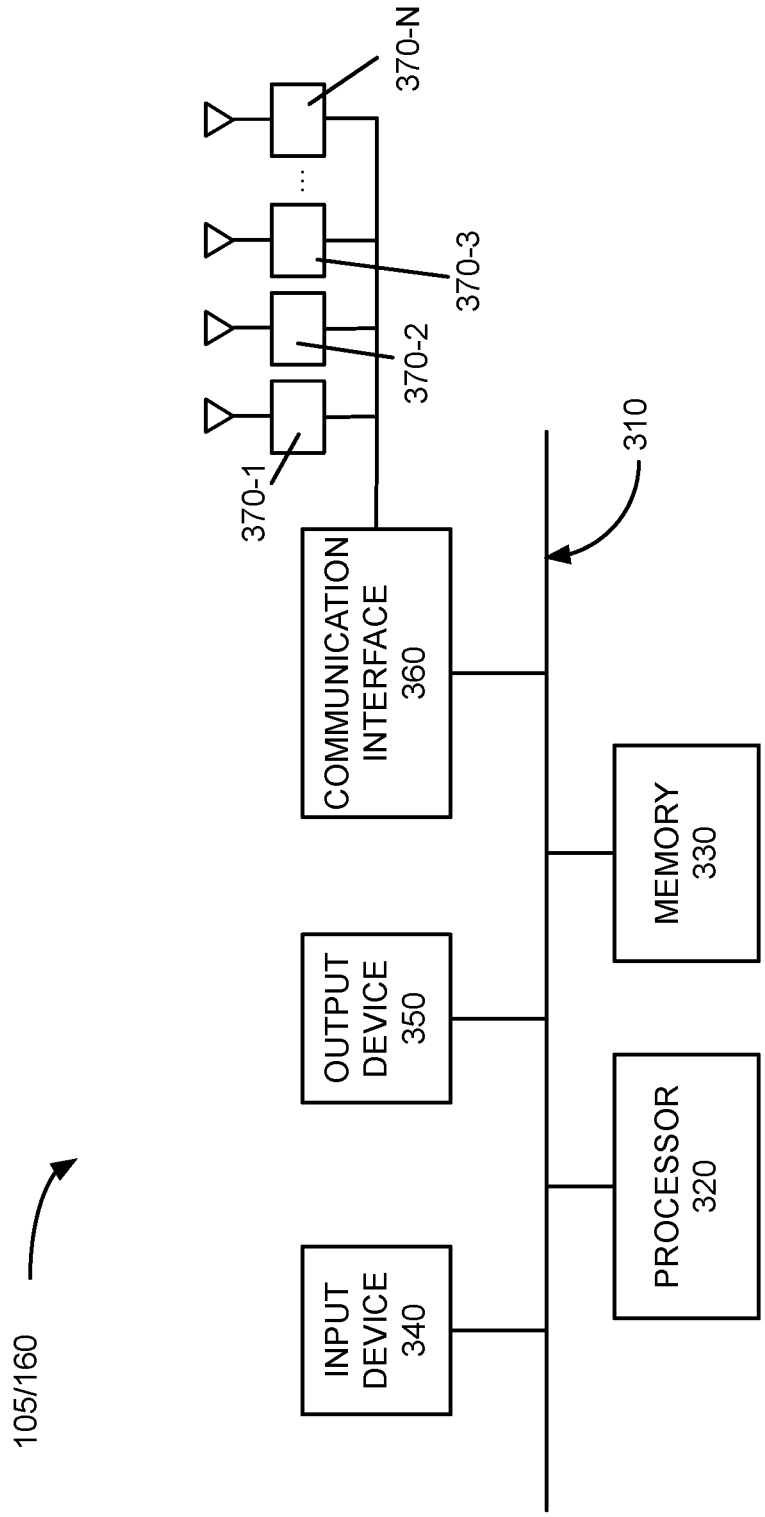
FIG. 3 is a diagram illustrating an exemplary configuration of components of the user device and access point devices of FIGS. 1A and 1B.

FIG. 3 illustrates an exemplary configuration of a device 300 that corresponds to user device 105/access point device 160 (referred to generally as user equipment (UE) 105/160) or service provider 120. As shown, device 300 may include bus 310, processor 320, memory 330, input device 340, output device 350, communication interface 360, and antennas components 370-1 to 370-N. Bus 310 may include a path that permits communication among the elements of device 300.

Processor 320 may include one or more processors, microprocessors, microcontrollers, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to NSS 120, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data via network 115. Communication interface 360 may also include a modem or an Ethernet interface to a LAN or other mechanisms for communicating with elements in a network, such as network 115 or another network.

Consistent with implementations described herein, device 300 may include a plurality of antennas components 370-1 to 370-N (collectively referred to as antennas 370 and individually as antenna 370) for operatively coupling to base stations 110. Each antenna 370 may include hardware (e.g., DAC/ADC converters, amplifiers, antenna elements, etc.) for interfacing with base stations 110.

The exemplary configuration illustrated in FIG. 3 is provided for simplicity. It should be understood that device 300 (e.g., UE 105/160) may include more or fewer components than illustrated in FIG. 3. In an exemplary implementation, device 300 perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
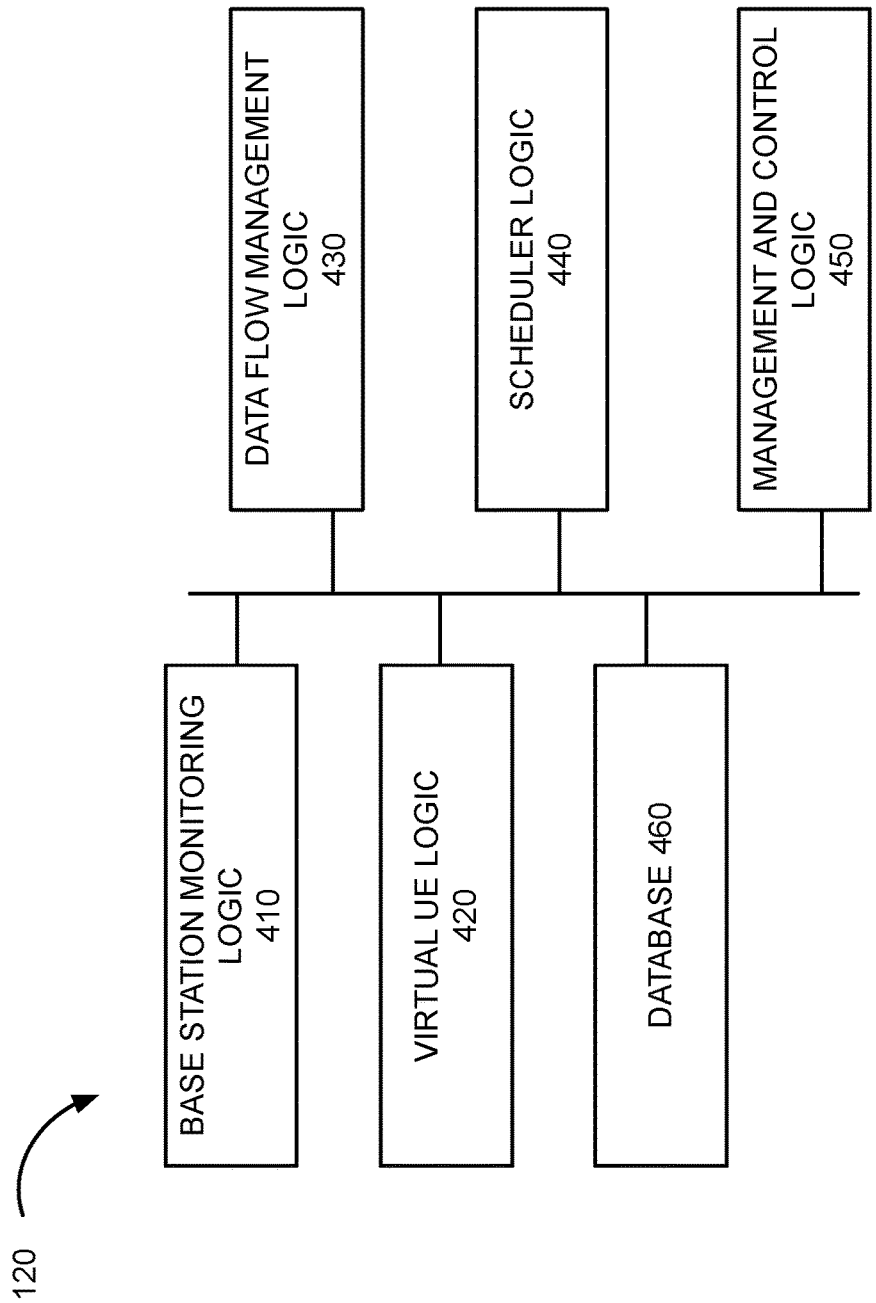
FIG. 4 is a diagram illustrating exemplary functional components of the UE device of FIGS. 1A and 1B.

FIG. 4 is an exemplary functional block diagram of components implemented in UE 105/160. In an exemplary implementation, all or some of the components illustrated in FIG. 4 may be implemented by processor 320 executing software instructions stored in memory 330. As shown, UE 105/160 may include base station monitoring logic 410, virtual UE logic 420, data flow management logic 430, scheduler logic 440, management and control logic 450, and database 460. In alternative implementations one or more of these components may be located externally with respect to UE 105/160, such as via an accessory or add-on device coupled to UE 105/160.

Base station monitoring logic 410 may include logic to identify available base stations 110 to which UE 105/160 may attach. For example, communication interface 360 may receive identification information that is broadcast by base stations 110 at particular frequencies or ranges of frequencies associated with UE 105/160 and service provider 120. The identification information may include the PSS and SSS of the base station 110 as well as additional information, from which the PCI for each base station 110 may be determined. A well provisioned access network of base stations 110 will vary the PSS and SSS values for respective base stations 110 such that neighboring or closely adjacent base stations 110 will not share a common PCI value.

Base station monitoring logic 410 may ascertain a signal strength (e.g., reference signal received power (RSRP)) and/or signal quality (e.g., reference signal received quality (RSRQ)) associated with each identified base station 110 and may store the information in database 460 for use by virtual UE logic 420 in implementing one or more virtual UEs. In addition to signal power and signal quality, base station monitoring logic 410 may also measure or calculate additional network characteristics indicative of the quality or capability of each base station 110, such as signal to interference plus noise ratio (SINR), call quality indicator (CQI), radio link control (RLC) delay, etc. These values may be stored in database 460 and updated at defined intervals for use by virtual UE logic 420, flow management logic 430, and schedule logic 440, as described below.

Virtual UE logic 420 may include logic to instantiate or manage a virtual UE for each available base station 110 identified by base station monitoring logic 410. In some implementations, virtual UE logic 420 may be configured to instantiate a virtual UE when the measured signal strength and/or signal quality values (e.g., RSRP/RSRQ) for a particular base station 110 surpass a predetermined threshold, indicating that the quality of the connection is sufficient to support at least a minimum level of service. In some embodiments, virtual UE logic 420 may determine whether any available base station 110 is dominant relative to other available base stations. If it is determined that a base station 100 is dominant, virtual UE logic 420 may determine to instantiate only a single virtual UE for the dominant base station, and not instantiate UE for other available base stations 110. In other embodiments, virtual UEs may be instantiated for all available base stations that exhibit minimum power or quality, regardless of whether a single base station is dominant. In this embodiment, data flow assignments may be made to take the relative dominance into consideration.

Consistent with embodiments described herein, UE 105/160 may be allocated a pool of unique UE identifiers (e.g., IMSI (international mobile subscriber identity) numbers) by, e.g., service provider 120 at the time of device provisioning. For example, such values may be provided on a universal integrated circuit card (UICC, also referred to as a subscriber identity module (SIM) card) or otherwise uniquely associated with UE 105/160 in a manner known to service provider 120. These allocated UE identifiers may be used by virtual UE logic 420 when instantiating each virtual UE and connecting to a base station 110 so that communications between UE 105/160 and base stations 110 using a virtual UE may be properly associated with a UE 105/160 for authentication, accounting, and authorization purposes.

Once a virtual UE has been instantiated and assigned to a particular base station 110, virtual UE logic 420 may be configured to communicate with base station 110 as if virtual UE were a standalone device. In other words, from the perspective of base station 110 and network 115, the virtual UE assigned to the base station 110 performs no differently than a conventional UE or a user device with respect to attachment, registration, paging, channel selection, etc. More specifically, each virtual UE may support the entirety of the LTE protocol stack, including the physical layer (PHY), the medium access layer (MAC), radio link control (RLC), packet data convergence control (PDCP), radio resource control (RRC), and non-access stratum (NAS) protocols.

As described briefly above, in some implementations, each instantiated virtual UE may be assigned or otherwise associated with a particular antenna component 370, thus providing a dedicated communication path between the virtual UE and the base station 110 to which it has been assigned. In some instances, the relationship between a virtual UE and a particular antenna component 370 may be fixed, whereas in other instances, the link between virtual UE and a particular antenna components 370 may be dynamic and may be based, for example, on particular capabilities (e.g., tunings) of antenna components, etc. In any event, the relationships between each instantiated virtual UE, antenna component 370, and attached base station 110 may be maintained in database 460 for use in data flow handling, as described in additional detail below. In other embodiments, a single antenna component 370 may be used to service all virtual UEs, with differences in channels, modulation allow UE 105/160 to simultaneously communicate with the connected base stations 110.

Virtual UE logic 420 may be further configured to determine when a base station 110 is no longer available for use by UE 105/160, e.g., by periodically monitoring the content of database 460 as updated by base station monitoring logic 410. For example, when the signal strength and/or quality corresponding to a particular base station 110 falls below the predetermined threshold(as), the virtual UE corresponding to the base station 110 may be either torn down (deleted) or returned to the pool of available virtual UEs.

In other embodiments, when a data session utilizing the impacted virtual UE and the base station 110 in question is in progress, the session may be handed off to another base station 110. In some instances, this may require handing off to a new, unattached base station 110 by the current virtual UE. In other instances, the data session may be handed off to another base station 110 that is already attached to another virtual UE, resulting in two (or more) virtual UEs being attached to a single base station 110. In this scenario, handoff is performed consistent with conventional LTE processing.

In other instances, such as when there are no additional, unattached, base stations available, the data session may be handed off to another previously instantiated virtual UE attached to a different base station. Because systems described herein necessarily require connection to multiple base stations, even where one or more of the base stations 110 exhibit poorer signal power/quality relative to one or more other base stations 110, it may be necessary to suspend traditional power/quality based-UE mobility to prevent pooling of all data flows on a single, most dominant, base station 110, such as with a traditional one-to-one LTE model.

However, in instances in which a base station becomes unavailable, such limited mobility may cause loss of data for flows previously assigned to the lost base station. Consistent with embodiments described herein, mobility may be only enabled in the event of a base station 110 failure (e.g., complete loss of communication with a particular base station 110). In this scenario, no additional or "new" data flows are assigned to the virtual UE associated with the failed base station 110

Data flows currently utilizing the virtual UE associated with the failed base station 110 are maintained until resolved via LTE mobility processing (e.g., handover) to another virtual UE. At this point, virtual UE logic 420 deactivates the virtual UE and returns it to the pool of available virtual UEs.

Data flow management logic 430 may include logic to manage bearer layer protocols for identification and scheduling by scheduler logic 440. For example, data flow management logic 430 may monitor data flowing to and from UE 105/160 for mapping (assigning) and scheduling by scheduler logic 440 based on, for example, data type, bandwidth requirements, application, source, destination, etc. The data may include one or more of HTTP, IP, TCP, and UDP data. In some implementations, such identification and mapping may be performed based on application layer (i.e., layer 4) or transport layer (i.e., layer 3) information included in data requests to and from UE 105/160. For example, data flow management logic 430 may monitor TCP segments relating to data being transmitted by UE 105/160 and segregate the segments based on type or destination. Data flow management logic 430 may also identify new session requests for which a layer 3 stream has not yet commenced. Information regarding data flows may be stored in database 460.

Scheduler logic 440 may include logic to assign data flows identified by data flow management logic 430 to instantiated virtual UEs. For example, scheduler logic 440 may retrieve the data flow information from database 460 and may assign the flows to specific virtual UEs based on various criteria, such as expected bandwidth requirement, type of service, etc., with those requiring better performance being assigned to virtual UEs associated with base stations 110 having high quality connections (e.g., higher SNR or SINR values, higher RSRQ/RSRP values, etc.). In some embodiments, where quality of base station connections is similar, data flows may be load balanced or distributed across the instantiated virtual UEs to increase throughput and/or performance. In other embodiments, where signal quality of one or more particular base stations 110 is greater than other base stations for which virtual UEs have been instantiated, all data flows may be assigned to those higher performing virtual UEs.

Management and control logic 450 may include logic to monitor and analyze the performance of other components of UE 105/160, such as virtual UE logic 420, data flow management logic 430, and scheduler logic 440. In some embodiments, management and control logic 450 may perform additional UE and network-related operations, administration, and maintenance (OAM) functions consistent with conventional wireless network devices.

Database 460 may include one or more data storage devices that store one or more databases of information associated with UE 105/160 and network 115. For example, as described above, base station monitoring logic 410, virtual UE logic 420, and data flow management logic 430 may store data regarding identified base stations 110, allocated or unallocated virtual UEs, and data flows generated or received by UE 105 in database 460.

An optional component of UE 105/160 may include network monitoring logic 460 to identify data capacity or usage statistics regarding network 115 during actual loading conditions in real time or near real time. In one implementation, network monitoring logic 460 may communicate with various base stations 110, as well as other devices in network 115, such as SGW 240, PGW 250, and MME 230. In addition, network monitoring logic 460 may identify total data traffic on a per base station basis. For example, network monitoring logic 460 may gather radio performance measurements from each base station 110 in network 115 over various periods of time. Network monitoring logic 460 may store this information in database 460.

Although FIG. 4 shows exemplary components of UE 105/160, in other implementations, UE 105/160 may include fewer components, different components, differently arranged components, or additional components than depicted in FIG. 4. In addition, functions described as being performed by one of the components in FIG. 4 may alternatively be performed by another one or more of the components of UE 105/160.

Figure 5:
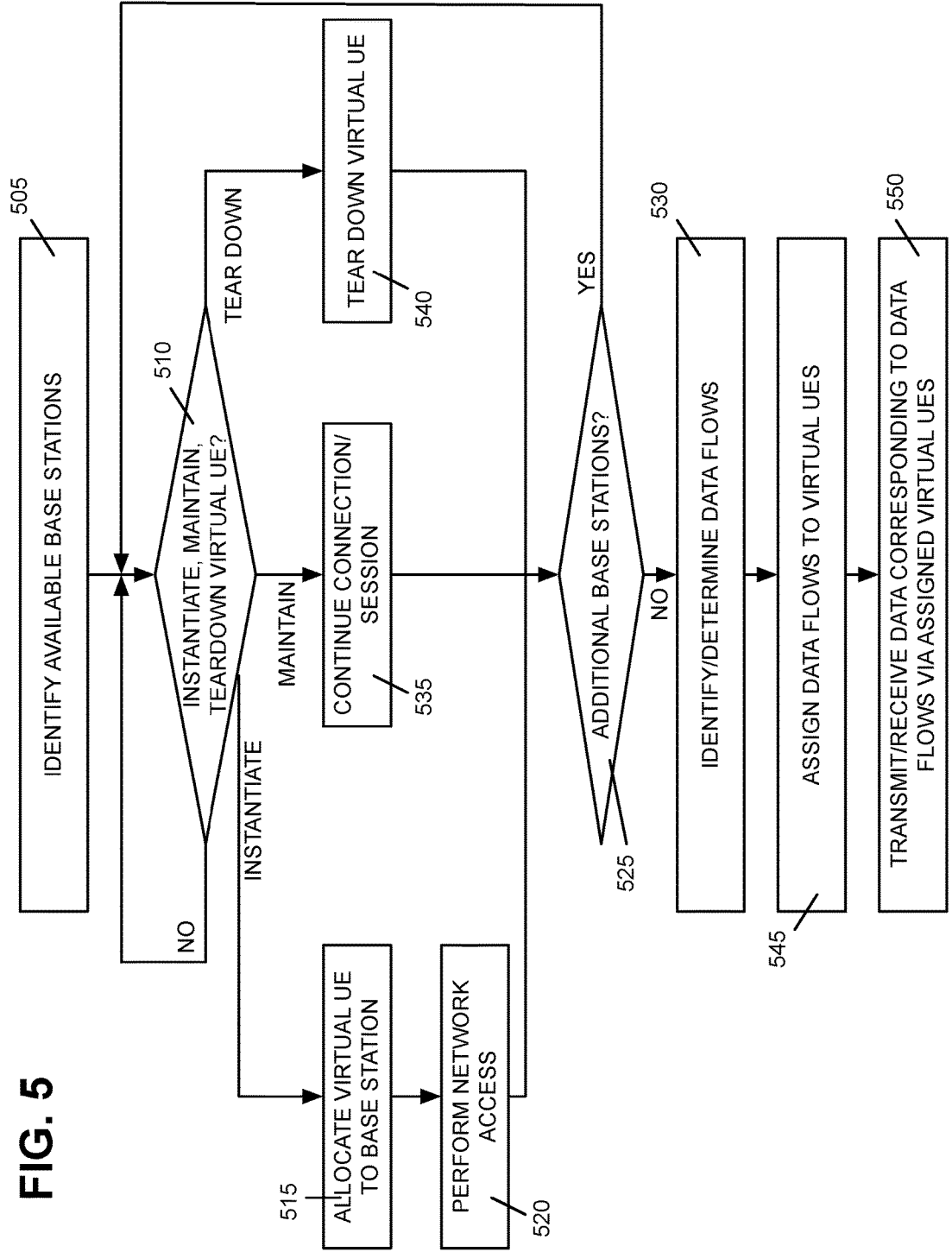
FIG. 5 is a flow diagram of a process for providing cross cell aggregation according to an implementation described herein.

FIG. 5 is a flow diagram illustrating an exemplary process 500 associated with providing cross cell aggregation in a wireless network consistent with embodiments described herein. Process 500 may begin with UE 105/160 identifying available base stations 110 (block 505). For example, as described above, base station monitoring logic 410 may receive identification information from nearby base stations 110 and may ascertain the strength or quality of the connection to the base stations 110.

Next, UE 105/160 may determine, for each identified base station 110, whether to instantiate, maintain, or tear down a virtual UE (block 510). For example, virtual UE logic 420 may determine that a new base station 110 has become available, such as when UE 105/160 is mobile across a geographic region. Virtual UE logic 420 may then determine whether a virtual UE should be assigned or handed over to the base station 110, based, for example, on metrics relating to signal strength or signal quality corresponding to the base station 110. In some implementations, these metrics may be ascertained or calculated by base station monitoring logic 410 and stored/updated in database 460 on a periodic basis (e.g., about 1.0 millisecond). If the metrics corresponding to the base station 110 do not meet minimum requirements, it may be determined to not allocate or assign a virtual UE to the base station 110. Processing may then advance to a next available base station 110, identified by base station monitoring logic 410.

However, if it is determined that the signal metrics corresponding to the base station 110 meet or exceed minimum requirements (block 510—Instantiate), a virtual UE may be allocated to the base station 110 or assigned from a pool of available virtual UEs (block 515). As described above, each UE 105/160 may be allocated a number of UE identities for use as virtual UEs. In some embodiments, physical hardware requirements may limit the number of virtual UEs that may be instantiated simultaneously, such as a number of discrete antenna components, available processing or memory capacity, etc. If all available virtual UEs have been previously allocated to other available base stations 110, virtual UE logic 420 may rank the available base stations 110 and may tear down a session with a lowest ranking, currently unused base station 110 to accommodate instantiation of a virtual UE to the new base station. Additionally, consistent with embodiments described herein, virtual UE logic 420 may facilitate handover from one base station to the new base station for a previously assigned virtual UE.

Next, UE 105/160 may perform network access for the assigned or handed over virtual UE (block 520). In particular, UE 105/160 may attach to the new base station using the assigned or handed over virtual UE (block 520). As described above, attachment using a virtual UE may be performed in a manner that is identical to conventional UE attachment to a base station, except that the UE identity corresponds to the assigned virtual UE identity instead of a singular identity associated with UE 105/160. Processing may then determine whether any additional base stations 110 are available for review (block 525). If additional base stations are to be reviewed (block 525—Yes), processing returns to block 510 for the next base station. However, if the available base stations have been reviewed (block 525—No), processing continues to block 530, as described below.

Returning to block 510, when a UE has been previously instantiated for an available base station 110, UE 105/160 may determine whether to maintain the UE. For example, virtual UE logic 420 may determine whether the signal strength or quality for the base station has dropped below a threshold level, or whether a ranking of the base station relative to other available base stations makes the virtual UE a candidate for handover or teardown.

For example, UE 105/160 may determine whether one or more data flows are currently allocated to a virtual UE. If so, virtual UE logic 420 may determine to maintain the virtual UE associated with a particular base station (block 510—Maintain), even where signal strength or other metrics are inferior to other base stations. Once it is determined to maintain the instantiation of the virtual UE, connection to network 115 may be continued (block 535). Consistent with embodiments described herein, maintaining of a virtual UE instantiation may include handover to a different base station 110, as briefly described above. Processing may then determine whether any additional base stations 110 are available for review (block 525), as described above.

In the event that the current virtual UE assigned to a particular base station 110 is not being used (i.e., no data flows are assigned), or when the number of available and suitable base stations 110 is less than the number of instantiated virtual UEs, it is determined to tear down the instantiated virtual UE (block 510—Tear Down) and the virtual UE is torn down (e.g., removed from memory) or returned to the pool of available virtual UEs (block 540). Consistent with embodiments described herein, tear down of a virtual UE may, where possible, include reassignment or handover of data flows assigned to the virtual UE to a different virtual UE associated with a base station having a stronger signal strength or better performance metrics (CQI, RLC delay, etc.). Processing may then determine whether any additional base stations 110 are available for review (block 525), as described above.

Turning to block 530, once virtual UEs have been assigned to any and all identified and suitable base stations 110 for a given monitoring interval, data flows associated with UE 105/160 may be determined. As described above, data flow management logic 430 may identify data flows based on layer 3 (IP) or layer 4 (TCP/UDP) information relating to data transmitted or received by UE 105/160. For example, TCP segments having a particular combination of source and destination ports may be identified as a data flow. In some embodiments, the identified data flows may be associated with particular data session requirements, such as required or optimal values for bandwidth, latency, jitter, packet loss, etc., which may be ascertained based on the content of the IP to TCP/UDP data being analyzed. In some embodiments, the identified data flows may be ranked based on the determined data session requirements to facilitate assignment by scheduler logic 440 to particular virtual UEs.

At block 545, the identified data flows are assigned to particular virtual UEs. For example, as described above, scheduler logic 440 may associate particular data flows or sets of data flows to particular virtual UEs, based on metrics or characteristics associated with, for example, network access to base stations 110. Essentially, the data flows identified by data flow management logic 430 may be matched to the available virtual UEs based on a determination regarding which virtual UE and its corresponding base station 110 are best able to meet the requirements or expectations associated with the data flow. As an example, a data flow having a lower bandwidth or throughput requirement may be assigned to a virtual UE connected to a base station 110 having a lower signal strength, or having a lower SINR value. It should be understood that embodiments described herein support both a one to one relationship between data flows and virtual UEs as well as a many to one relationship, in which multiple data flows may be assigned to a single instantiated UE.

Subsequent data corresponding to the data flows is then transmitted and received based on the assigned virtual UE (block 550). In particular, virtual UE logic 420 may forward the data flows assigned thereto via their respective radio connection with the corresponding base stations 110. As described above, each virtual UE is configured to operate as a standalone entity from the perspective of base station 110 and network 115. In this manner, data requirements for UE 105/160 (e.g., an individual UE with multiple data flows), or multiple UE's accessing network 115 via AP 160) may be aggregated across a number of base stations 110.

Figure 6A:
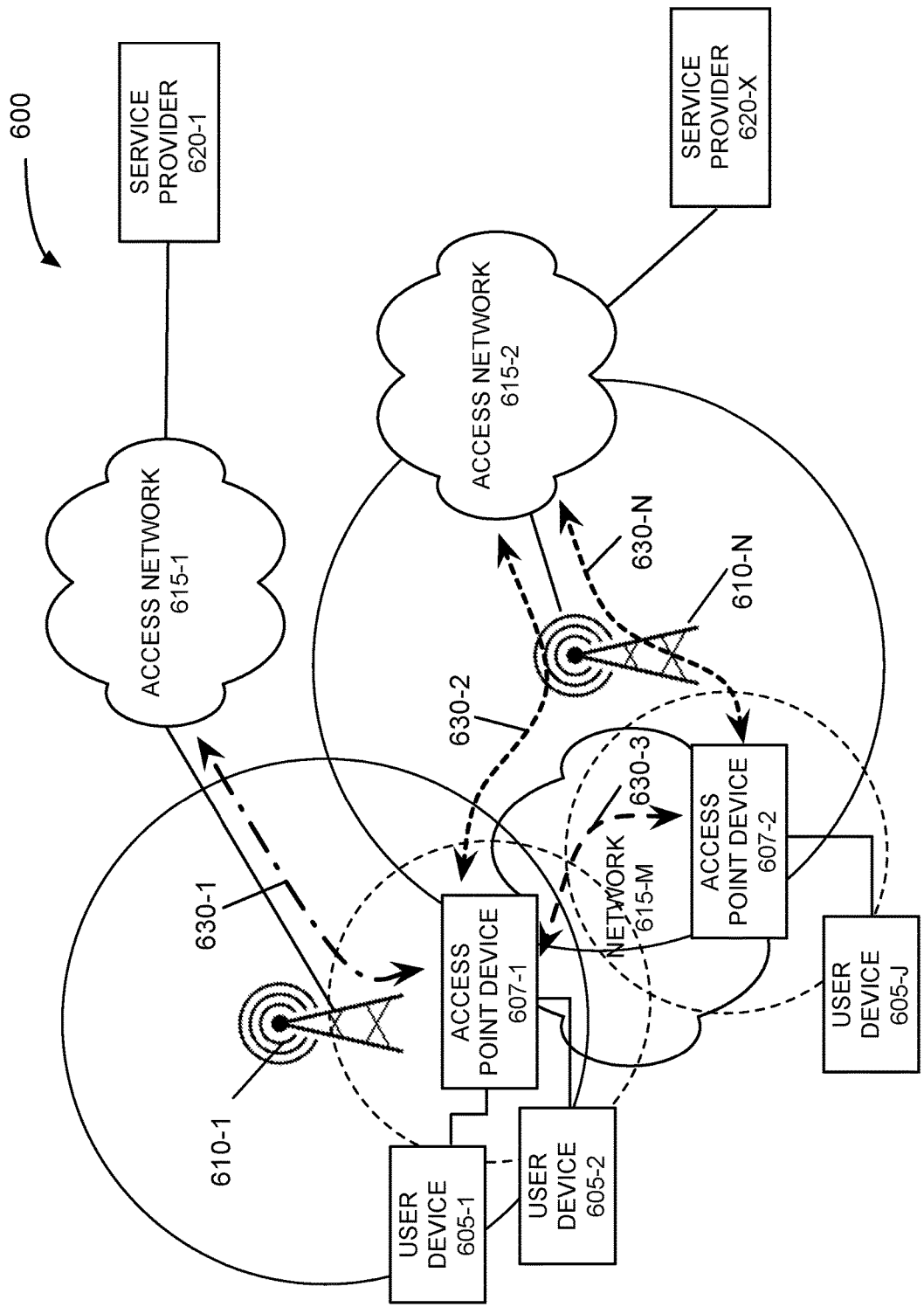
FIG. 6A is a diagram illustrating another environment according to an implementation described herein.

FIG. 6A is a diagram of an overview of another exemplary environment 600 in which systems and methods described herein may be implemented. Environment 600 may include user devices 605-1 through 605-J (individually referred to as user device 605 and collectively as user devices 605), access point devices 607-1 and 607-2 (individually referred to as access point device 607 and collectively as access point devices 607), base stations 610-1 to 610-N (individually referred to as base station 610 and collectively as base stations 610), access networks 615-1 to 615-M, and service providers 620-1 to 620-X.

Similar to user devices 155 described above, user devices 605 may include mobile devices, such as wireless or cellular telephones or smart phones, PCs, laptops, tablets, etc. Furthermore, consistent with the embodiment of FIGS. 6A and 6B, user devices 605 may include one or more components integrated within another device, such as information and entertainment (so-called "infotainment"), diagnostic, passenger personal electronic devices (e.g., mobile phones, tablets, game systems, etc.), or vehicle control systems integrated within an automobile. User device 605 may connect to one or more of access networks 615 and other devices in environment 600 (e.g., service providers 620, other user devices 605, etc.) via a wired or wireless connection with access point device 607.

Consistent with embodiments described herein, access point device 607 may include one or more interfaces (e.g., wired or wireless) for operatively connecting user devices 605 to one or more base stations 610 or other access point devices 607. For example, access point device 607 may include a Wi-Fi® interface, an Ethernet interface, a Bluetooth® Interface, etc. for connecting to user devices 605. In addition, access point devices 607 may include various wireless interfaces for enabling communication with base stations 610 and other access point devices 607 (either one to one or via a mesh network of a number of access point devices 607).

Consistent with embodiments described herein, and as described in additional detail below, the type and number of interfaces may be configurable and dynamic subsequent to installation to allow for changing network environments, evolving communication standards, user selection/preference, etc. For example, in some implementations, a single access point device 607 may be configurable to support 4G LTE, 5G, Wi-Fi (e.g., 802.11x), machine to machine (M2M), and vehicle to vehicle (V2V) dedicated short-range communications (DSRC), thereby enabling user devices 605 connected to the access point device 607 to communicate with a variety of different devices that may be modified or adapted to various network and environmental circumstances.

The wireless ranges of access point devices 607 are graphically depicted in FIG. 6A as dashed circles centered on each access point device 607. It should be understood that this depiction is provided for merely illustrative purposes. In practice, the effective range and coverage of an access point device 607 may by impacted by many factors including radio frequency interference, physical obstructions, communications technology, transmitter power, etc.

Base stations 610 may include network devices that provide a radio frequency interface between one or more access networks 615 and access point devices 607, with each being associated with a particular access network 615 and covering a defined geographic region, sometimes referred to as a cell or sector. For example, consistent with embodiments described herein, base station 610-1 and access network 615-1 may be correspond to a first network technology associated with a first service provider such as a first wireless carrier (e.g., 4G LTE at specific access frequencies), while base station 610-N and access network 615-2 may correspond to a second network technology associated with a second service provider (e.g., a M2M network). In other some embodiments, access networks 615 may include multiple different versions of a similar access technology (e.g. 4G LTE or 5G networks) operated by different service providers 620.

The coverage areas associated with each base station 610 are graphically depicted in FIG. 6A as solid circles centered on each base station 610. Although the coverage regions in FIG. 6A are depicted as extending symmetrically or radially about the respective base station, it should be understood that a region of coverage provided by each base station may not by symmetrical or radial in practice, and is based on various characteristics, such as geography, topology, a number and location of any permanent or transient structures (buildings, vehicles, etc.), transmitter power, etc. Furthermore, as shown in FIG. 6A, base stations 610 associated with different access networks 615 may operate in overlapping or adjacent coverage regions.

Access networks 615 may include one or more networks that are capable of receiving and transmitting data, voice and/or video signals. For example, access networks 615 may include one or more public switched telephone networks (PSTNs) or other type of switched network. Access networks 615 may further include one or more satellite networks, one or more packet switched networks, such as an Internet protocol (IP) based network, a local area network (LAN), a wide area network (WAN), an LTE network, a 5G network, an M2M network, a Wi-Fi network, an intranet, the Internet, etc. In still other implementations, access network 615 may include an ad-hoc mesh network made up of a number of access point devices 607, such as a DSRC V2V mesh network and, in such implementations, may not include associated base stations 610.

Service providers 620 may include one or more computer devices and systems associated with providing services via access networks 615. For example, service providers 620 may store information regarding service plans for a large number of subscribers (also referred to herein as customers) and track data usage for each subscriber over a period of time (e.g., one month). Furthermore, as described in additional detail below, service providers 620 may be configured to support provisioning of virtual subscriber identity modules (SIMs) for allocation to requesting access point devices 607 in an on-demand, or dynamic manner.

As shown in FIG. 6A, each access point device 607 may be positioned at a nexus or point of overlap within the coverage regions of a number of base stations 610 and other access point devices 607. Given the relative locations of base stations 610 and access point devices 607, a particular access point device 607 may be capable of operatively communicating with more than one base station 610 or other access point device 607 simultaneously.

Consistent with embodiments described herein, access point device 607 may include components configured to enable user device 605 to operatively couple to more than one of base stations 610 and/or other access point devices 607 simultaneously, in a manner that is transparent to the base stations 610 or other functional aspects of network 615. For example, similar to user device 105 described above in relation to FIG. 1A, access point device 605 may include antenna components 370 for transmitting and receiving wireless signals from base stations 610 and/or other access point devices 607.

Arrows 630-1 to 630-N in FIG. 6A illustrate the different connections between devices/networks. In some embodiments, the connections between access point devices 607 and respective base stations 610 (or other access point devices 607) may be based on particular types of data, data sessions, base station capacity, signal strength or quality, network statistics, etc.

More specifically, as described in additional detail below, access point device 607 may be configured to include a plurality or "pool" of virtual user equipment identifications or VUEs. During operation, one or more user devices 605 may request connection with an access network 615 and/or other user device 605 from access point device 607. In response, access point device 607 may allocate or assign a particular VUE from the pool of available VUEs with an available base station 610 or DSRC network (e.g., a V2V network). Using the assigned VUEs, access point device 607 may negotiate attachment to requested networks (e.g., via base stations 610 or other access point devices 607) as if different physical devices were each requesting individual access. Once connected, a scheduling engine may then be configured to map data or traffic associated with particular applications or particular types of data with respective VUEs, so that the respective data sessions are performed using the network device attached to the particular VUE. By enabling an access point device 607 to connect to and utilize multiple access networks 615 or network connections simultaneously, an adaptable and configurable network interface may be provided that may be responsive to changing network environments, technologies, and requirements.

Consistent with implementations described herein, to support dynamic provisioning and attachment to different access networks 615, access point devices 607 may be configured to request and securely receive on-demand SIMs. In a traditional network environment, SIMs are provided to user devices as physical cards that are securely provisioned and associated with a service provider during card manufacture. To support a dynamic and configurable multi-network environment, such as that described in relation to FIG. 6A, access point devices 607 may be configured with software-based virtual SIMs (vSIMs) that are provisionable and configurable on-demand as network needs and technologies change.

As described herein, access point devices 607 may request one or more vSIMs in response to a request from a user device 605 or in response to configuration of access point device 607 directly. In contrast with the VUE pool described above, requests for vSIMs may be transmitted by access point device 607 to a service provider for which a vSIM is being requested. For example, access point device 607 may transmit a vSIM request via a Radio Resource Control (RRC) setup messaging or during some other network attachment mechanism. For example, for an LTE access network 615, the vSIM request may be transmitted as part of the Non-Access Stratum (NAS) attach request payload. The vSIM request may identify an account identifier or device identifier that may associate the request with a user's vSIM user account, which may have been previously established via out-of-band communications (e.g., online, over the phone, via a dedicated application (app) associated with the access point device, etc.). In one implementation, as part of the vSIM request, access point device 607 may provide an authentication code (e.g., passcode, etc.) solicited from user input or stored in a local memory (e.g., memory 330) to authenticate the vSIM request to the respective service provider 620.

Figure 6B:
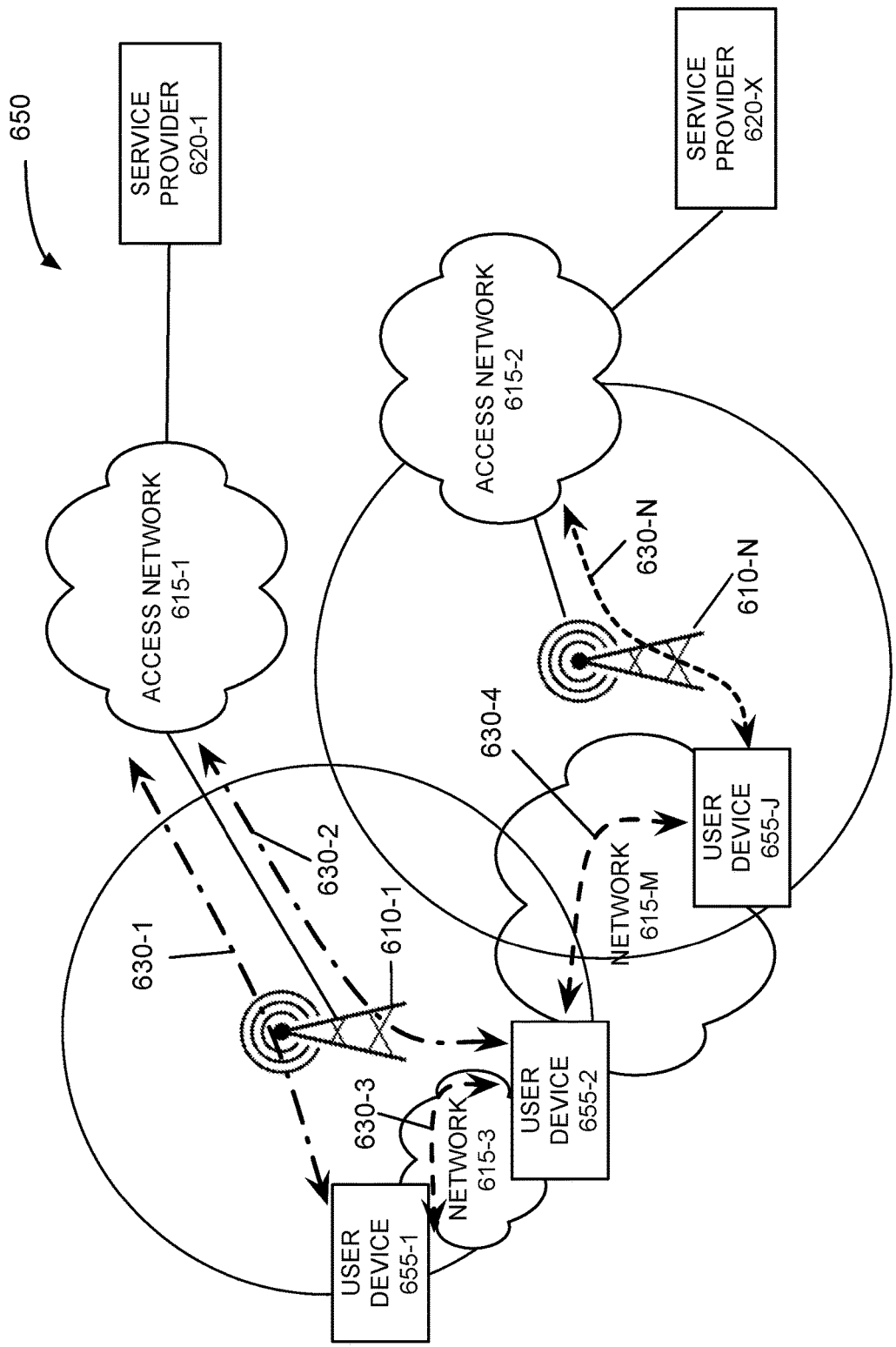
FIG. 6B is a diagram illustrating a modification to the environment of FIG. 6A.

FIG. 6B is a diagram of an overview of a second exemplary environment 650 in which systems and methods described herein may be implemented. Environment 650 may include user devices 655-1 through 655-J (individually referred to as user device 655 and collectively as user devices 655), base stations 610, access networks 615, and service providers 620. Where appropriate, like numerals have been used to designate similar elements in each of environments 600 and 650.

For example, similar to environment 600 described above, base stations 610 and access networks 615 may be configured to receive connection requests directly from user devices 655 rather than via intermediary access point devices 607. Consistent with embodiments described herein, user devices 655 may be configured to support and/or implement VUE allocation and vSIM request processing in a manner similar to that described above with respect to access point devices 607.

Figure 7:
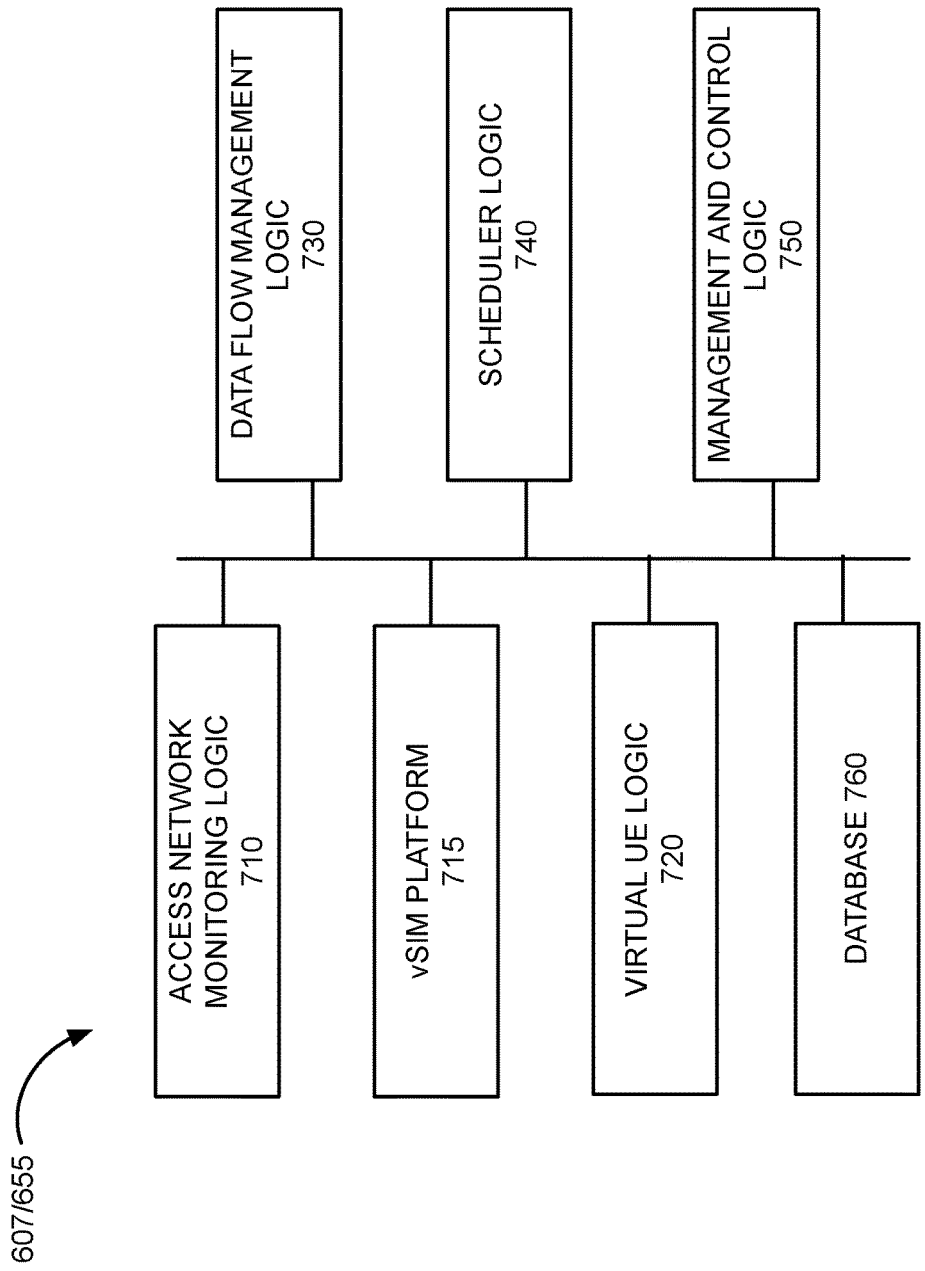
FIG. 7 is a diagram illustrating exemplary functional components of the access point device of FIGS. 6A and 6B.

FIG. 7 is an exemplary functional block diagram of components implemented in access point device 607 and/or user device 655. In an exemplary implementation, all or some of the components illustrated in FIG. 7 may be implemented by processor 320 executing software instructions stored in memory 330. As shown, access point device 607/user device 655 may include access network monitoring logic 710, virtual SIM (vSIM) platform 715, virtual UE (VUE) logic 720, data flow management logic 730, scheduler logic 740, management and control logic 750, and database 760. In alternative implementations one or more of these components may be located externally with respect to access point device 607 or user device 655, such as via an accessory or add-on device.

Access network monitoring logic 710 may include logic to identify available access networks 615 to which access point device 607/user device 655 may connect. For example, communication interface 360 may receive identification information that is broadcast by base stations 110 or other access point devices 607/user devices 655 at particular frequencies or ranges of frequencies associated particular networks or network technologies. For cellular-type access networks 615, the identification information may include the PSS and SSS of base station 610 as well as additional information, from which the PCI for each base station 110 may be determined. For ad-hoc or mesh networks that operate without base stations 610, the identification information may designate a particular access point device 607/user device 655 from which the signal originates.

Access network monitoring logic 710 may ascertain a signal strength, signal quality, SINR, etc. associated with each identified base station 610/access point device 607 and may store the information in database 760 for use by vSIM platform 715 or VUE logic 720 in implementing one or more virtual UEs. These received or calculated values may be updated at defined intervals for use by vSIM platform 715, VUE logic 720, flow management logic 730, and schedule logic 740, as described below.

vSIM platform 715 may include logic to request and instantiate virtual SIMs from service providers 120 in the manner described above. For example, vSIM platform 715 may be configured to ascertain whether a user wishes to connect to an access network 615 associated with a new (or different) service provider 620. Such a determination may be made based on received user input, predetermined criteria, location settings, etc. When it is determined that the access network 615 for the new service provider 620 should be utilized, vSIM platform 715 may initiate a vSIM request as part of an attachment request transmitted to a base station 610 associated with the particular access network 615. Consistent with embodiments described herein, in response to a vSIM request, service provider 620 may authenticate the request and may allocate or assign a vSIM to access point device 607.

VUE logic 720 may include logic to instantiate or manage a virtual UE for one or more available base stations 610 and/or other access point devices 607 identified by access network monitoring logic 710. In some implementations, VUE logic 720 may be configured to instantiate a virtual UE when the measured signal strength and/or signal quality values for a particular base station 610 surpass a predetermined threshold, indicating that the quality of the connection is sufficient to support at least a minimum level of service. As described herein, VUEs may be instantiated for at least one base station 610 associated with available access networks 615 that have been associated with access point device 607, e.g., based on an existing service provider relationship, network technology settings, etc. In other embodiments, such as those described above with respect to FIGS. 1A-5, VUE logic 720 may instantiate VUEs for more than one base station 610 associated with a particular service provider 120, so as to aggregate and optimize connectivity, etc.

Consistent with embodiments described herein, each access point 607 may be allocated a pool of unique UE identifiers (e.g., IMSI numbers). For example, such values may be securely provided to vSIM platform 715 during device manufacture and may be carrier or service provider agnostic (i.e., SIM or vSIM agnostic) in that they are not locked to or permanently affiliated with any particular service provider. The allocated UE identifiers may be used in combination with information regarding assigned or allocated vSIMs by VUE logic 720 when instantiating each VUE and connecting to a base station 610 or other access point device 607 so that communications between access point device 607 and base stations 610/other access point device 607 using a VUE may be properly associated with the transmitting access point device 607 for authentication, accounting, and authorization purposes.

Once a virtual UE has been instantiated and assigned to a particular base station 610 (or other access point device 607/network environment/technology), VUE logic 720 may be configured to communicate with base station 610 as if the instantiated VUE were a standalone UE device associated with a traditional SIM rather than an assigned vSIM. In other words, from the perspective of base station 610 and/or access network 615, the VUE assigned to the base station 610 performs no differently than a conventional UE or a user device with respect to attachment, registration, paging, channel selection, etc. More specifically, each VUE may support an entire suite of network protocols, such as the entirety of the LTE protocol stack, including the physical layer (PHY), the medium access layer (MAC), radio link control (RLC), packet data convergence control (PDCP), radio resource control (RRC), and non-access stratum (NAS) protocols. For non-base station embodiments, such as device to device, ad-hoc, or mesh network environments, a VUE may be instantiated to include any device information (e.g., a selected IMSI, etc.) necessary to communicate with devices in such environments.

As described above, in some implementations, each instantiated VUE may be assigned or otherwise associated with a particular antenna component 370, thus providing a dedicated communication path between the virtual UE and the base station 610 to which it has been assigned. Consistent with embodiments described herein, the relationship between a vSIM and/or a VUE and a particular antenna component 370 may be fixed or may be dynamically based, for example, on particular capabilities (e.g., tunings) of antenna components, etc. In other embodiments, a single antenna component 370 may be used to service all vSIMs and VUEs, with differences in frequency, channels, modulation, etc. allowing access point device 607/user devices 655 to simultaneously communicate with the connected base stations 610 and/or other access point devices 607.

VUE logic 720 may be further configured to determine when a base station 610 or other access point device 607 is no longer available for use by access point device 607, e.g., by periodically monitoring the content of database 460 as updated by access network monitoring logic 710. For example, when the signal strength and/or quality corresponding to a particular base station 610 or access network 615 falls below predetermined threshold(s) (which may be different for each type of connection), VUE(s) corresponding to the base station 610 or other access point device 607 may be either torn down (deleted) and returned to the pool of available VUEs or the connections/sessions associated with the particular base station 610/access network 615 may be handed off to other base station or network devices in the manner described above.

Data flow management logic 730 may include logic to manage bearer layer protocols for identification and scheduling by scheduler logic 740. For example, data flow management logic 730 may monitor data flowing to and from access point device 607 for mapping (assigning) and scheduling by scheduler logic 740 based on, for example, data type, carrier (service provider), bandwidth requirements, application, source, destination, etc. The data may include one or more of HTTP, IP, TCP, and UDP data. In some implementations, such identification and mapping may be performed based on application layer (i.e., layer 4) or transport layer (i.e., layer 3) information included in data requests to and from access point device 607. For example, data flow management logic 730 may monitor TCP segments relating to data being transmitted by UE 105/160 and segregate the segments based on type or destination. Data flow management logic 730 may also identify new session requests for which a layer 3 stream has not yet commenced. Information regarding data flows may be stored in database 760.

Scheduler logic 740 may include logic to assign data flows identified by data flow management logic 730 to instantiated virtual UEs. For example, scheduler logic 740 may retrieve the data flow information from database 760 and may assign the flows to specific virtual UEs based on various criteria or characteristics, such as expected bandwidth requirement, type of service (e.g., M2M, V2V, voice over IP), etc., with those matching the required criteria being assigned to corresponding VUEs. In some embodiments, where quality of multiple VUEs for multiple access networks are capable of handling similar types of data, data flows may be load balanced or distributed across the instantiated virtual UEs to increase throughput and/or performance.

Management and control logic 750 may include logic to monitor and analyze the performance of other components of access point device 607, such as vSIM platform 715, VUE logic 720, data flow management logic 730, and scheduler logic 740. In some embodiments, management and control logic 750 may perform additional UE and network-related operations, administration, and maintenance (OAM) functions consistent with conventional network devices.

Database 760 may include one or more data storage devices that store one or more databases of information associated with access point device 607 (or user device 655) and access networks 615. For example, as described above, access network monitoring logic 610, vSIM platform 615, VUE logic 620, and data flow management logic 630 may store data regarding identified base stations 610, access networks 615, assigned or allocated vSIMs, allocated or unallocated VUEs, and data flows generated or received by access point device 607 (or user device 655) in database 760.

Although FIG. 7 shows exemplary components of access point device 607 and/or user device 655, in other implementations, these devices may include fewer components, different components, differently arranged components, or additional components than depicted in FIG. 7. In addition, functions described as being performed by one of the components in FIG. 7 may alternatively be performed by another one or more of the components of access point device 607 and/or user device 655.

Figure 8:
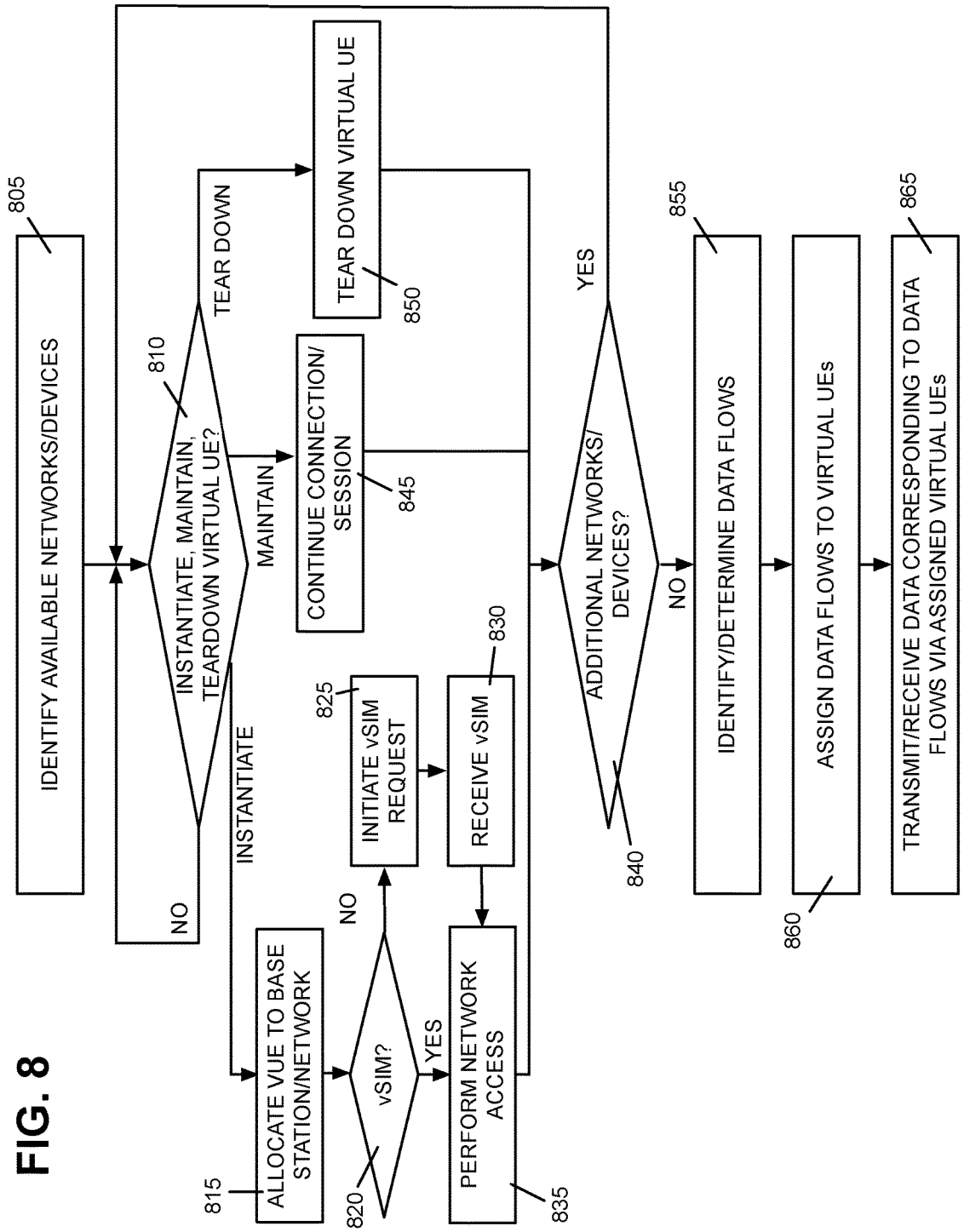
FIG. 8 is a flow diagram of a process for providing multi-network utilization according to an implementation described herein.

FIG. 8 is a flow diagram illustrating an exemplary process 800 associated with providing cross cell aggregation in a wireless network consistent with embodiments described herein. Process 800 may begin with access point device 607 (or user device 655) identifying available base stations 610 and/or devices (e.g., other access point devices 607 or user devices 655) with which it may communicate (block 805). For example, as described above, access network monitoring logic 710 may receive identification information from nearby base stations 610 or other devices 607 and may ascertain the strength or quality of the connection, the type of access network 615 associated therewith, etc.

Next, access point device 607 (or user device 655) may determine, for each identified base station 610 (or another access point device 607), whether to instantiate, maintain, or tear down a virtual UE (block 810). For example, VUE logic 720 may determine that a new base station 610 has become available, such as when access point device 607 (or user device 655) is mobile across a geographic region. VUE logic 720 may then determine whether a virtual UE should be assigned or handed over to the base station 610 (or other device), based, for example, on metrics relating to signal strength or signal quality corresponding to the base station 610 or other network characteristics/requirements. In some implementations, these metrics may be ascertained or calculated by access network monitoring logic 710 and stored/updated in database 460 on a periodic basis (e.g., about 1.0 millisecond).

In addition, access network monitoring logic 710 may determine with which access networks 615 access point device 607 is configured to communicate. For example, access network monitoring logic 710 may determine whether a user has indicated that they would like to begin communicating with a new access network 615 with which the base station 610 is associated. As briefly described above, such an indication may be received in an out-of-band manner with respect to the particular access network 615, such as via an access point device configuration system, an "app" associated with access point device 607, an online configuration, etc.

If the metrics or other information corresponding to the base station 610 do not meet minimum requirements or if a network relationship with a particular base station 610 or other device is not established (block 810—NO), it may be determined to not allocate or assign a virtual UE to the base station 610. Processing may then advance to a next available base station 610 (or other device), identified by access network monitoring logic 710.

However, if it is determined that the signal metrics corresponding to the base station 610 meet or exceed minimum requirements and that the base station 610 corresponds to an access network with which access point device 615 has a new or existing relationship (block 810—Instantiate), a virtual UE may be allocated to the base station 610 or assigned from a pool of available virtual UEs (block 815). As described above, each access point device 607 (or user device 655) may be allocated a number of UE identities for use as virtual UEs. In some embodiments, physical hardware requirements may limit the number of virtual UEs that may be instantiated simultaneously, such as a number of discrete antenna components, available processing or memory capacity, etc. If all available VUEs have been previously allocated to other available base stations 610, VUE logic 720 may rank the available base stations 610 and may tear down a session with a lowest ranking or currently unused base station 610 to accommodate instantiation of a virtual UE to the new base station 610.

Next, access point device 607 (or user device 655) may determine, for the current base station 610, whether a vSIM, where necessary, has been previously allocated for use with the base station (block 820). For example, access point monitoring logic 710 may determine whether access point device 607 is configured to communicate with an access network 615 associated with the base station 610. Such configuration information may be stored in database 760. When it is determined that a vSIM is not necessary for the particular access network 615 (e.g., for direct or ad-hoc communications networks), or that a vSIM has been previously allocated to access point device 607 for a particular base station 610 (block 820—YES), processing continues to block 835 described below.

However, when it is determined that a vSIM is both required and has not been previously allocated to access point device 607 for a particular base station 610 (block 820—NO), access point device 607 may initiate a vSIM request procedure (block 825). For example, as described above, vSIM platform 715 of access point device 607 may transmit a vSIM request to service provider 620 via base station 610 during attachment to base station 610. The request may include information necessary to authenticate the request, such as VUE identification information, a previously shared passcode, authentication code, etc. In response, base station 610 may forward the request to service provider 620 associated therewith for processing. The present example assumes that the request is properly authenticated and that a vSIM is received from service provider 620 (block 830).

Next, access point device 607 (or user device 655) may perform network access for the assigned or handed over virtual UE (block 835). For example, access point device 607 (or user device 655) may attach to the new base station 610 using the assigned or handed over VUE and allocated vSIM. Alternatively, network access may be performed directly with other devices without a vSIM requirement, such as for ad-hoc networks, etc. As described above, attachment using a VUE may be performed in a manner that is identical to conventional UE attachment to a base station or other device, except that the UE identity corresponds to the assigned virtual UE identity instead of a singular identity associated with access point device 607 (or user device 655). Processing may then determine whether any additional base stations 610 are available for review (block 840). If additional base stations are to be reviewed (block 840—Yes), processing returns to block 810 for the next base station/device. However, if the available base stations have been reviewed (block 840—No), processing continues to block 855, as described below.

Returning to block 810, when a VUE has been previously instantiated for an available base station 610 or network device/access network, access point device 607 (or user device 655) may determine whether to maintain the VUE. For example, VUE logic 720 may determine whether the signal strength or quality for the base station 610 or connected device has dropped below a threshold level, or whether a ranking of the base station relative to other available base stations makes the VUE a candidate for handover or teardown.

For example, access point device 607 (or user device 655) may determine whether one or more data flows are currently allocated to a virtual UE. If so, virtual UE logic 720 may maintain the virtual UE associated with a particular base station (block 810—Maintain), even where signal strength or other metrics are inferior to other base stations. Once it is determined to maintain the instantiation of the VUE, connection to the particular access network 615 may be continued (block 845). Consistent with embodiments described herein, maintaining of a virtual UE instantiation may include handover to a different base station 610, as briefly described above. Processing may then again determine whether any additional base stations 610 are available for review (block 840), as described above.

In the event that the current virtual UE assigned to a particular base station 610 is not being used (i.e., no data flows are assigned), or when the number of available and suitable base stations 610 is less than the number of instantiated virtual UEs, it is determined to tear down the instantiated virtual UE (block 810—Tear down) and the virtual UE is torn down (e.g., removed from memory) or returned to the pool of available virtual UEs (block 850). Consistent with embodiments described herein, tear down of a virtual UE may, where possible, include reassignment or handover of data flows assigned to the virtual UE to a different virtual UE associated with a base station having a stronger signal strength or better performance metrics (CQI, RLC delay, etc.). Processing may then determine whether any additional base stations 610 are available for review (block 840), as described above.

Turning to block 855, once virtual UEs have been assigned to any and all identified and suitable base stations 610 or networks/devices for a given monitoring interval, data flows associated with access point device 607 (or user device 655) may be determined. As described above, data flow management logic 730 may identify data flows based on layer 3 (IP) or layer 4 (TCP/UDP) information relating to data transmitted or received by access point device 607 (or user device 655). For example, TCP segments having a particular combination of source and destination ports may be identified as a data flow.

At block 860, the identified data flows are assigned to particular virtual UEs. For example, as described above, scheduler logic 740 may associate particular data flows or sets of data flows to particular virtual UEs, based on metrics or characteristics associated with, for example, network access to base stations 610. Essentially, the data flows identified by data flow management logic 730 may be matched to the available virtual UEs based on a determination regarding which virtual UE and its corresponding base station 610 are best able to meet the requirements or expectations associated with the data flow, including information identifying the type of data being transmitted/received, etc.

Subsequent data corresponding to the data flows is then transmitted and received based on the assigned virtual UEs (block 865). In particular, VUE logic 420 may forward the data flows assigned thereto via their respective radio connection with the corresponding base stations 610/other connected devices. As described above, each VUE is configured to operate as a standalone entity from the perspective of base station 610 and/or access networks 615. In this manner, a single access point device 607 may operate as a dynamically configurable interface for a variety of different and possibly changing access networks 615.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described with respect to FIGS. 5 and 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices. Furthermore, as used herein, the terms assembly or component are intended to be broadly construed as hardware, firmware, or a combination of hardware and software.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:
1. A device, comprising
a memory;
a communication interface;
an antenna; and
one or more processors to:
identify a plurality of networks available for connection via the communication interface and the antenna;
determine one or more of a signal strength or signal quality for each of the plurality of networks, allocate a virtual user equipment (VUE) to each of two or more of the identified plurality of networks based on the one or more of the signal strength or signal quality,
   wherein the two or more networks comprise different types of networks, the different types of networks further comprising:
      two or more of a cellular network, a wireless data network, an ad-hoc network, a mesh network, a machine-to-machine network, or a vehicle-to-vehicle network;
   connect with each of the two or more networks using a respective VUE from the allocated VUEs;
   identify network characteristics for the connections with the plurality of networks;
   identify data flows; and
   assign the identified data flows to the respective VUEs based on the identified network characteristics.

2. The device of claim 1, wherein the two or more networks are operated by two or more different service providers.

3. The device of claim 1, wherein a first network of the two or more networks requires that the device include a subscriber identification module (SIM), and wherein the one or more processors are further configured to:
   request a virtual SIM (vSIM) from a service provider associated with the first network;
   receive the requested vSIM from the service provider; and
   connect with the first network based on the allocated VUE and the vSIM.

4. The device of claim 1, wherein the data flows are identified based on source and/or destination information.

5. The device of claim 1, wherein the one or more processors are further configured to:
   determine session requirements corresponding to each of the identified data flows,
   wherein the session requirements comprise one or more of network type, data type, bandwidth, latency, jitter, or packet loss; and
   assign the identified data flows to respective VUEs based on the determined session requirements.

6. The device of claim 1, wherein the data flows are identified based on application layer or transport layer information provided in data to be transmitted.

7. The device of claim 1, wherein the device comprises an access point device and wherein the communication interface is configured to facilitate connections thereto by a plurality of user devices.

8. The device of claim 7, wherein the access point device is integrated within a vehicle.

9. The device of claim 1, wherein when the one or more processors allocate the VUEs, the one or more processors selects the VUEs from a pool of available VUEs, and
   wherein each of the VUEs include information associated with an owner of the device.

10. A non-transitory computer-readable medium storing one or more instructions that, when executed by one or more processors, cause the one or more processors to:
   identify a plurality of networks available for connection to a device;
   determine one or more of a signal strength or signal quality for each of the plurality of networks,
   allocate a virtual user equipment (VUE), from a pool of available VUEs associated with the device, for two or more of the identified networks based on the one or more of the signal strength or signal quality,
   wherein the two or more networks comprise different types of networks, the different types of networks further comprising:
      two or more of a cellular network, a wireless data network, an ad-hoc network, a mesh network, a machine-to-machine network, or a vehicle-to-vehicle network;
   connect with each of the two or more networks using a respective VUE;
   identify network characteristics for the connections with the two or more base stations;
   identify data flows for the device; and
   assign the identified data flows to the VUEs based on the identified network characteristics.

11. The non-transitory computer-readable medium of claim 10, wherein the two or more networks are operated by two or more different service providers.

12. The non-transitory computer-readable medium of claim 10, wherein a first network of the two or more networks requires that a connecting device include a subscriber identification module (SIM), and wherein the one or more instructions further cause the one or more processors to:
   request a virtual SIM (vSIM) from a service provider associated with the first network;
   receive the requested vSIM from the service provider; and
   connect with the first network based on the allocated VUE and the vSIM.

13. A method, comprising:
   identifying, by a user equipment (UE) device, a plurality of networks available for connection to the UE device;
   allocating a virtual UE (VUE), selected from a pool of available VUEs associated with the UE device, for two or more of the identified plurality of networks,
   wherein the two or more networks comprise different types of networks, the different types of networks further comprising:
      two or more of a cellular network, a wireless data network, an ad-hoc network, a mesh network, a machine-to-machine network, or a vehicle-to-vehicle network;
   connecting with each of the two or more base stations using a respective VUE;
   identifying network characteristics for the connections with the two or more networks;
   identifying data flows for the UE device;
   determining session requirements corresponding to each of the identified data flows,
   wherein the session requirements comprise one or more of network type, data type, bandwidth, latency, jitter, or packet loss; and
   assigning the identified data flows to the VUEs based on the identified network characteristics and the determined session requirements.

14. The method of claim 13, wherein the two or more networks are operated by two or more different service providers.

15. The non-transitory computer-readable medium of claim 10, wherein the data flows are identified based on source and/or destination information.

16. The non-transitory computer-readable medium of claim 10, wherein the one or more instructions further cause the one or more processors to:
   determine session requirements corresponding to each of the identified data flows, wherein the session requirements comprise one or more of network type, data type, bandwidth, latency, jitter, or packet loss; and assign the identified data flows to respective VUEs based on the determined session requirements.

17. The method of claim 13, wherein a first network of the two or more networks requires that the UE device include a subscriber identification module (SIM), wherein the method further comprises:

requesting a virtual SIM (vSIM) from a service provider associated with the first network;

receiving the requested vSIM from the service provider; and connecting with the first network based on the allocated VUE and the vSIM.

18. The non-transitory computer-readable medium of claim 10, wherein the device comprises an access point device and wherein the communication interface is configured to facilitate connections thereto by a plurality of user devices.

19. The non-transitory computer-readable medium of claim 18, wherein the access point device is integrated within a vehicle.

20. The method of claim 13, wherein the UE device comprises an access point device and wherein the communication interface is configured to facilitate connections thereto by a plurality of other user devices.

* * * * *